United States Patent [19]
Culley et al.

[11] Patent Number: 5,406,426
[45] Date of Patent: Apr. 11, 1995

[54] AUTOMATED, FAULT TOLERANT, ZONE SECTOR MARK GENERATION METHOD

[75] Inventors: Martin L. Culley, Berthoud; Marvin DeForest, Longmont, both of Colo.

[73] Assignee: Maxtor Corporation, San Jose, Calif.

[21] Appl. No.: 107,452

[22] Filed: Aug. 17, 1993

[51] Int. Cl.⁶ .............................................. G11B 5/09
[52] U.S. Cl. ...................................................... 360/51
[58] Field of Search ............................. 360/46, 49, 51

[56] References Cited

U.S. PATENT DOCUMENTS

| | | | |
|---|---|---|---|
| 5,276,564 | 1/1994 | Hessing et al. | 360/51 |
| 5,278,703 | 1/1994 | Rub et al. | 360/51 |
| 5,311,376 | 5/1994 | Joan et al. | 360/51 |
| 5,313,340 | 5/1994 | Takayama et al. | 360/51 |

*Primary Examiner*—Donald Hajec
*Assistant Examiner*—Won Tae C. Kim
*Attorney, Agent, or Firm*—Blakely, Sokoloff, Taylor & Zafman

[57] ABSTRACT

The present invention includes a method, apparatus and disk format for implementation of the same to provide fault tolerant detection of ID fields for data sectors in order to eliminate errors caused by mis-alignment and mis-detection of hard sector marks. Logic is provided to initiate a time-out count at the completion of a hard sector count. The time-out count is specified to be a period of time within which a hard sector mark should be detected. If the time out count counts down and a hard sector mark is not detected, then a possible error situation arises and the fault tolerant process is initiated to compensate for the lack of detection of a hard sector mark. Thus, at the end of the time-out count, a small burst count is started. This small burst count is of a shorter duration than the original burst count utilized, but is long enough to bring the head assembly to the location in the sector at the beginning of the user data at which time the hard sector count is initiated to count down the user data locations for that hard sector. Thus, the beginning of the user data area will always be determined and errors due to ill-defined user data areas caused by mis-detection of an hard sector mark are avoided.

15 Claims, 8 Drawing Sheets

AUTOMATED, FAULT TOLERANT, ZONE SECTOR MARK GENERATION METHOD

BACKGROUND OF THE INVENTION

1. Field of the Invention

The present invention relates to the control of disk drives. More particularly, the present invention relates to the process of locating soft sectors using a fault tolerant method and media format for the same.

2. Art Background

Magnetic disks widely used in the computer industry have a surface on which data is encoded. The disk surface is divided into concentric circles known as tracks. Each track is divided into equal sized segments referred to as hard or servo sectors. Servo information is written at the beginning of each hard sector. This information is coherent from the inside to the outside diameter of each disk surface. A specified data pattern is written directly onto the disk which defines the start of each hard sector. The control hardware for the disk drive which reads the disk includes logic to decode this hard sector information and generate hard sector marks which are used to format data sectors. User information is stored in entities known as soft or data sectors. Data sectors are often defined as soft sectors because the data sector marks are not decoded directly from information written on the disk. Therefore, the soft sector marks used to define data fields may occur anywhere on a track.

In order to meet the needs for increased densities of data and the capacity of the drives, a method of sector division is used to increase the capacity of the drives through a recording technique known as zone density recording. As the size of each track increases with radius, more information can be stored on a track. Therefore, disks surfaces are divided into several circumferential zones. All tracks within a given zone contain a constant number of data sectors. The number of data sectors per track varies in different zones. The outermost zone contains the largest number of data sectors and the innermost zone contains the fewest. Because the number of soft sectors varies from zone to zone, data sectors have come to be known sometimes as zone sectors.

Figure 1A:
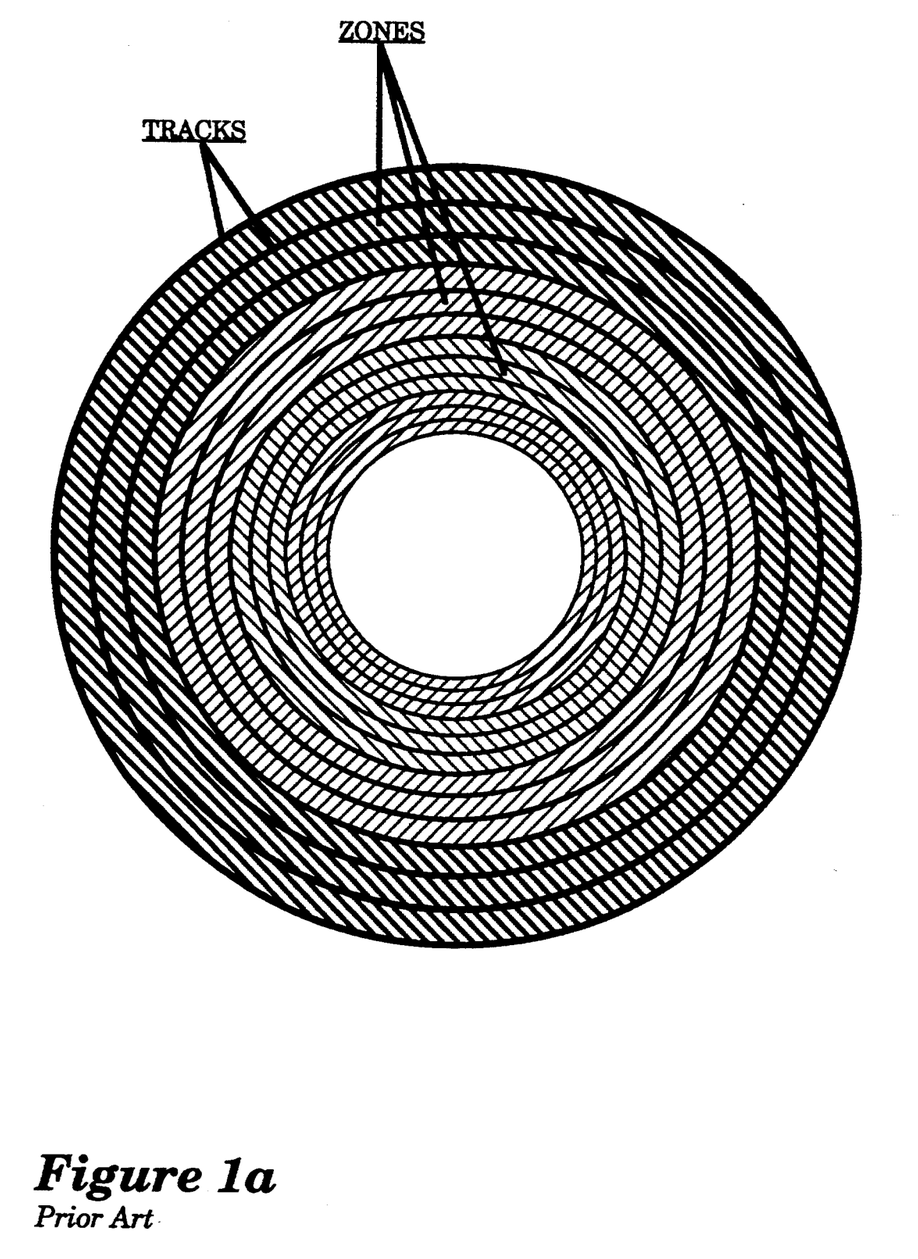
FIGS. 1a and 1b illustrate prior art disk drive surfaces and the tracks and zones delineated on the surfaces.
Figure 1B:
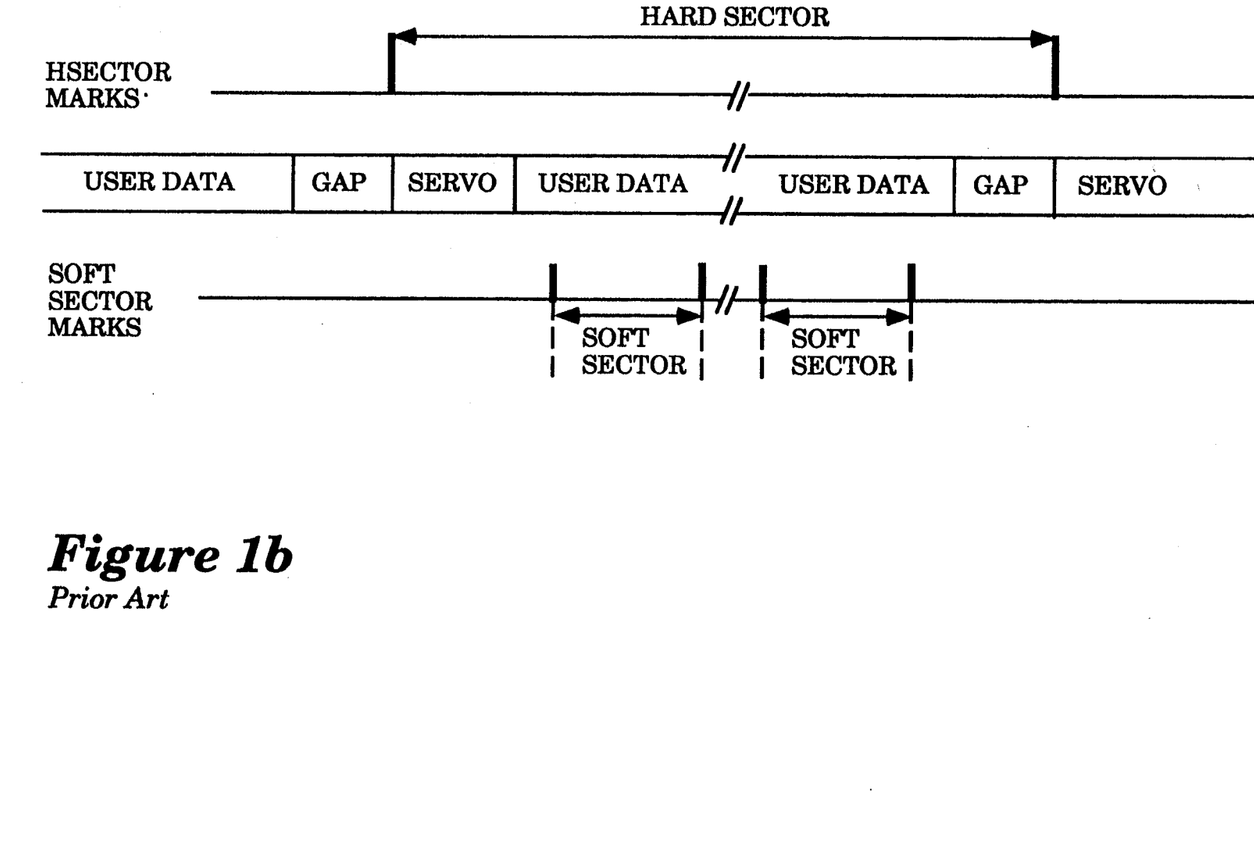

FIG. 1a illustrates the use of the term zone and track. The disk surface of FIG. 1a contains four zones, each zone containing three tracks. The number of tracks per zone is dependent upon the drive configuration and the complexity of the controlling mechanism. FIG. 1b provides an illustrative format showing the relationship between hard and soft sectors. Each hard sector is denoted by a gap followed by servo information and the user data. Gaps separate each hard sector. Soft sectors are located within the user data area of the hard sector. The signal, H sector, marks hard sector boundaries and is decoded from information recorded directly on the disk. Therefore, the location of the H sector mark cannot be moved after the manufacturing process is complete. The soft sector marks, on the other hand, are used to show the extent of a data sector and the locations of soft sector marks change from zone to zone, as the density of soft sectors per zone changes with the increase in the circumference of the track.

Figure 2:
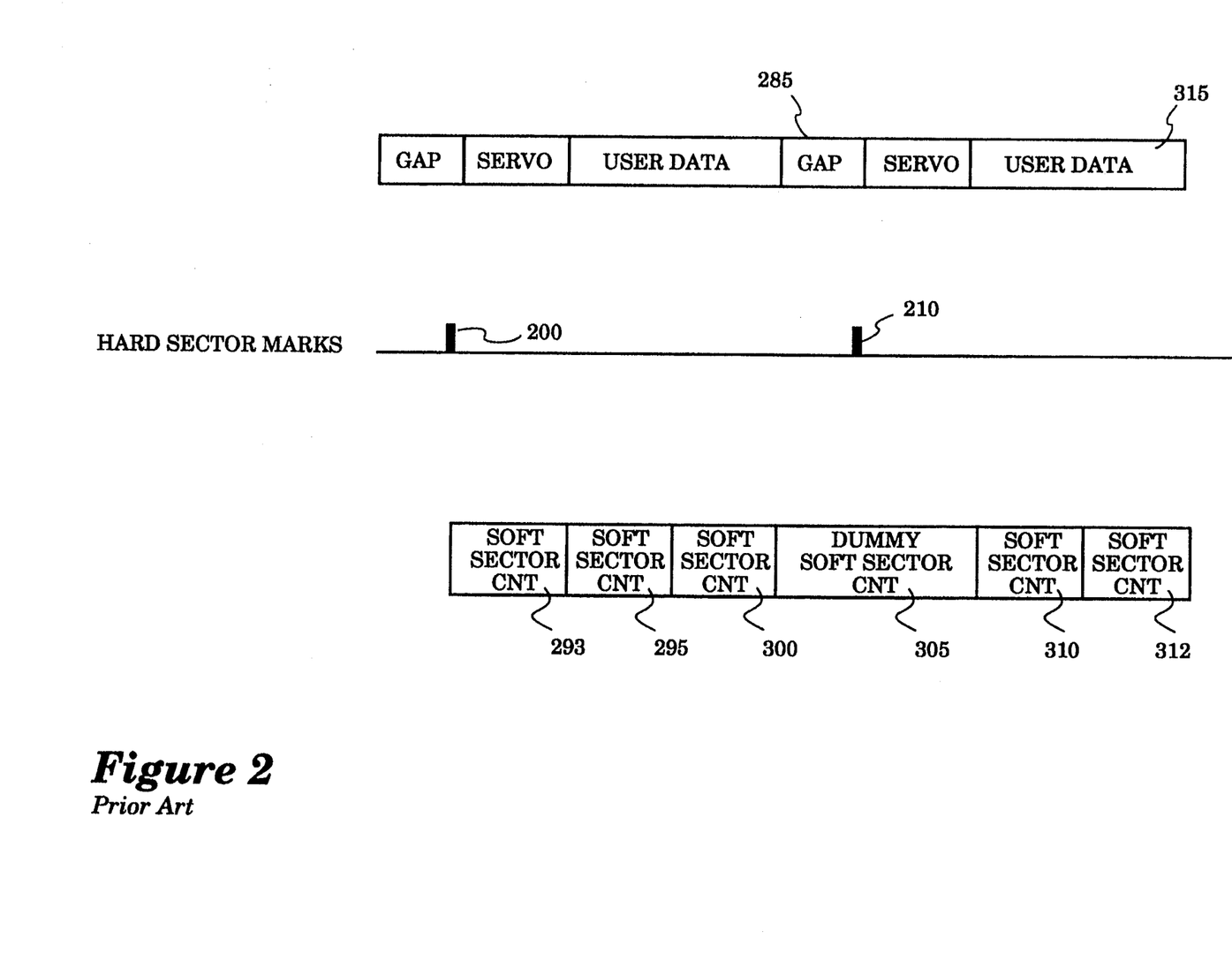
FIG. 2 is a prior art representation of hard sectors and the soft sector counts used to detect and determine user data areas and soft sectors.

In an attempt to compensate for missed H sector marks (e.g., 210) a dummy soft sector count 305 is initiated. This dummy soft sector count is of a duration to estimate the approximate location of the next soft sector mark. However, problems still occur when the H sector mark is not detected. With the ability to pack in more data (soft) sectors into hard sectors, the likelihood that the data sectors are split between hard sectors is not uncommon. Thus, if a hard sector mark is missed, the ID field of the soft sector may not be detected and the soft sector counts used to delineate the soft sectors will be off and erroneous data recordings and readings will occur.

Various techniques have been used to identify the locations of soft sector. For example, in one prior method, up to ten count values are programmed by the firmware upon entering each zone. The disk drive is synchronized once for each frame; a frame defined as a group of hard sectors that has the same z-sector (soft sector) arrangement. Although this method had the benefit of limited real time firmware intervention, added data tolerance is required in the format to offset spin speed variations over the entire frame. In addition, if the hard sector mark is missed, the disk drive loses synchronization with the disk and generates soft sector signals in the wrong location causing potential loss of data. The disk drive would not be able to re-synchronize until detection of an index mark (which occurs once per revolution).

As shown in FIG. 2, in an alternate prior method, the firmware at the disk drive is loaded with count values at each hard sector location. The disk drive uses these counts to specify the location of soft sector pulses based upon H-sector pulses and previous soft sector pulses. As shown in FIG. 2, when an H sector mark is detected, a predetermined number of soft sector counts 293, 295, 300 are initiated. Although this technique decreases the tolerance the problems associated with the first method, real time firmware intervention is still required which adds complexity and overhead to the disk drive operation. Furthermore, errors still occur if a hard sector mark is missed. The present invention eliminates the problems inherent in the first method without the required firmware intervention required by the second method.

SUMMARY OF THE INVENTION

The present invention includes a method, apparatus and disk format for implementation of the same to provide fault tolerant detection of ID fields for data sectors in order to eliminate errors caused by mis-alignment and mis-detection of hard sector marks. Logic is provided to initiate a time-out count when a gap between hard sectors is detected. The time-out count is specified to be a period of time within which a hard sector mark should be detected. When a gap is detected and the time out count counts down and a hard sector mark is not detected, then a possible error situation arises and the fault tolerant process is initiated to compensate for the lack of detection of a hard sector mark. Thus, at the end of the time-out count, a small burst count is started. This small burst count is of a shorter duration than the original burst count utilized, but is long enough to bring the head assembly to the location in the sector at the beginning of the user data at which time the H sector count is initiated to count down the user data locations for that hard sector. Thus, the beginning of the user data area will always be determined and errors due to ill-defined user data areas caused by mis-detection of an H sector mark are avoided. Furthermore, efficiency is increased because the tolerance buildup is minimized to two sectors as opposed to a full frame, as is found in the prior art.

In an alternate embodiment, compensation for time required to write and read data sectors which are split between two hard sectors is provided. In particular, if at the end of an H sector count, the soft sector count has not counted down completely indicating that the data sector has not been complete, the soft sector count will resume at the beginning of the user data area of the next hard sector. However, it has been determined that a period of time is required to continue the data operation and therefore, the soft sector count. In this regard a split count is provided to give that time allowance.

BRIEF DESCRIPTION OF THE DRAWINGS

The objects, features and advantages of the present invention will become apparent to one skilled in the art from the following detailed description in which.

DETAILED DESCRIPTION OF THE INVENTION

In the following description for purposes of explanation numerous details are set forth in order to provide a thorough understanding of the present invention. However, it will be apparent to one skilled in the art that these specific details are not required in order to practice the invention. In other instances, well known electrical structures and circuits are shown in block diagram form in order not to obscure the present invention unnecessarily.

Figure 3:
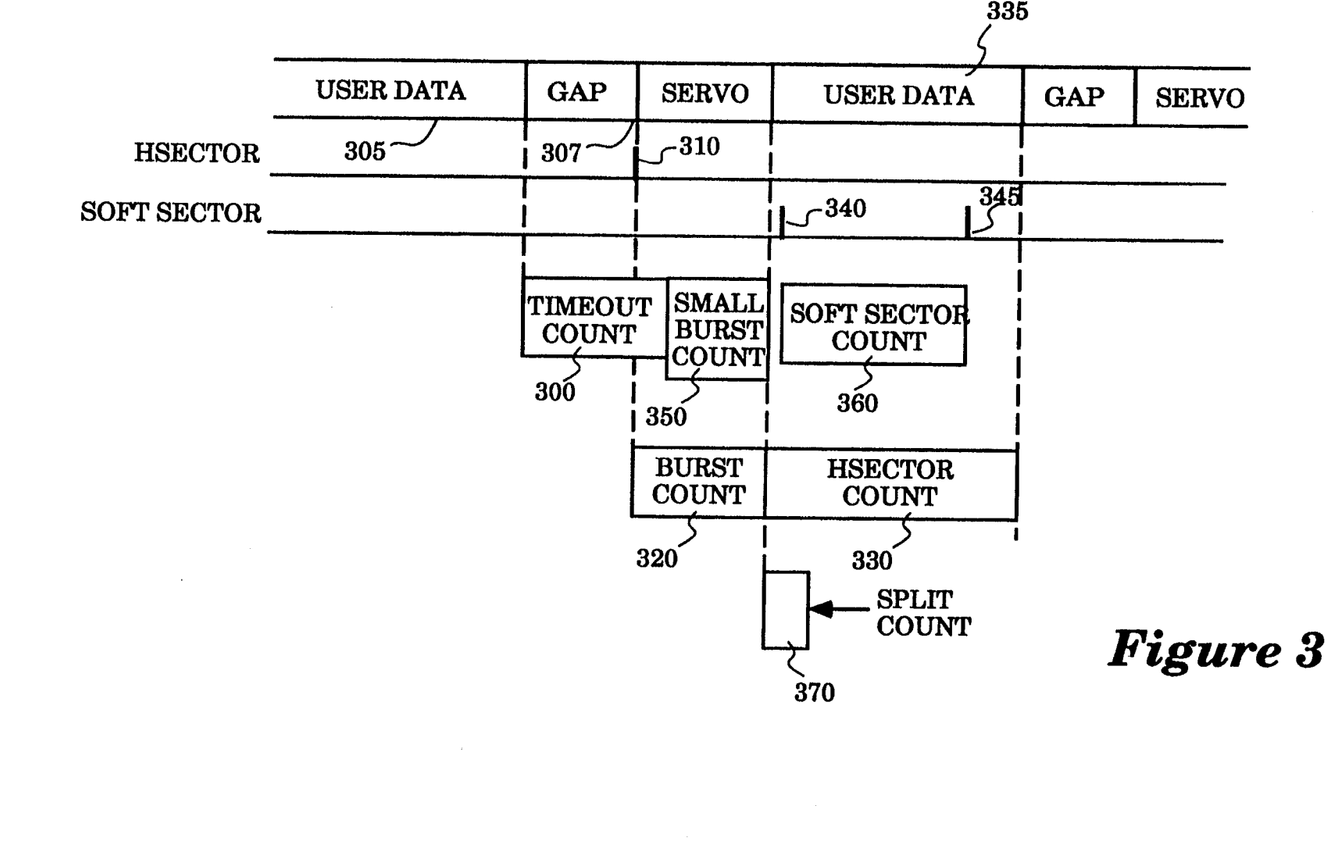
FIG. 3 illustrates the method for fault tolerant determination of ID fields of soft sectors.

FIG. 3 is illustrative of the format and count values used in the method for accurately determining soft sectors. The present embodiment uses six count values to correctly track the hard sectors and soft sectors on the disk. The time-out count 300 is initiated at the end of user data 305 (corresponding to the gap 307) and is of a duration during which a hard sector mark, for example 310, would be encountered. If the hard sector mark 310 is detected, normal processing continues such that a burst count 320 is initiated, after which the hard sector count 330 is initiated. During the countdown of the hard sector count, user data 335 is encoded onto the disk, specifically during the soft sectors delineated by the soft sector marks 340, 345. Soft sector marks are generated using soft sector counts initiated based upon the hard sector marks 310 detected.

If, at the countdown of the time-out count 300 a hard sector mark is not detected, then a small burst count 350 begins in place of a burst count. This small burst count provides a sufficient count indicative of where the hard sector count should begin if a hard sector mark was correctly detected. As noted in FIG. 3, the small burst count 350 and burst count 320 end at approximately the same location such that the hard sector count 330 can be consistently initiated. Thus, the soft sector marks 340, 345 and soft sector count 360 are accurately utilized and user data is not lost.

Preferably, operation of the drive is initiated by detection of a hard sector mark. Once a hard sector mark is detected, the burst count is initiated, and once counted down, the hard sector count is initiated. At the end of the hard sector count, the fault tolerant process begins with the initiation of the time-out count.

In an alternate embodiment, a split count 370 is provided when necessary to give an additional period of time for the drive to correctly locate the beginning of the soft sector 340. The split count takes into account the extra time required to split a soft sector between two hard sectors. Therefore, if a soft sector count has not counted down by the time a hard sector count has counted down, then the soft sector countdown is resumed at the beginning of the next soft sector mark in the next hard sector. However, prior to resuming the soft sector count, a split count 370 is counted down. This provides sufficient allowance for split counts.

Figure 4A:
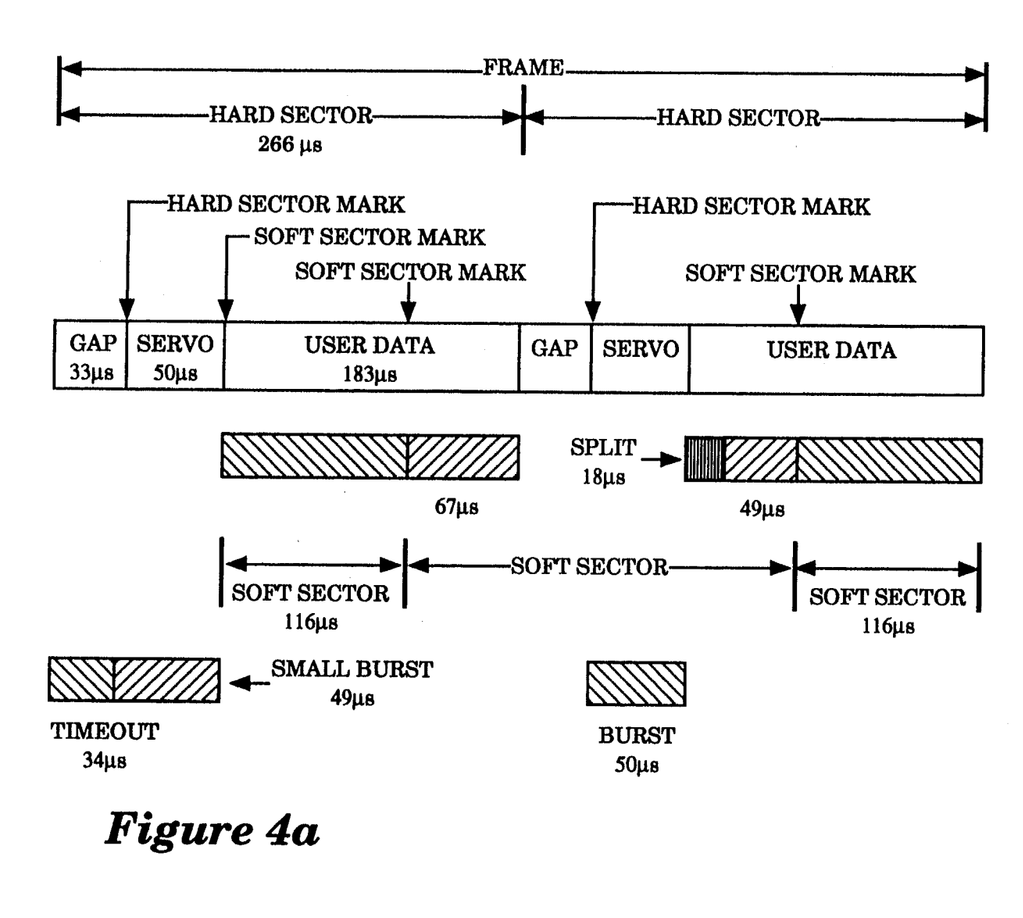
FIGS. 4a and 4b illustrate exemplary timings and count values utilized.
Figure 4B:
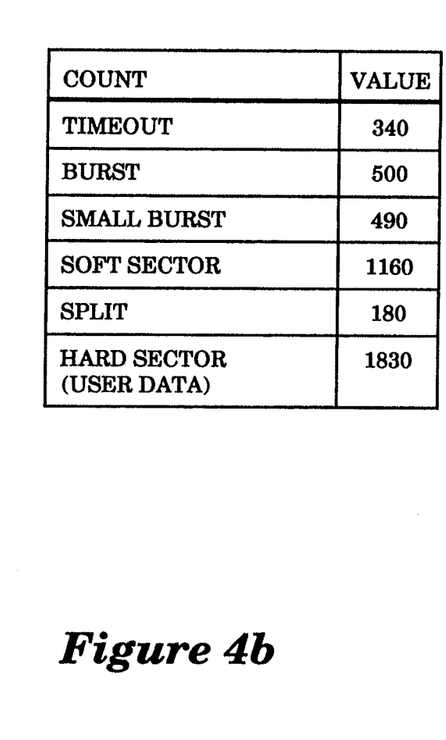

FIGS. 4a and 4b provide an example of timings and corresponding count values which may be used. In this example, the frequency of the mechanism is 10 MHz, the track is formatted to include 24 frames per track, and each frame is formatted to include two hard sectors and three soft sectors per frame.

Figure 5:
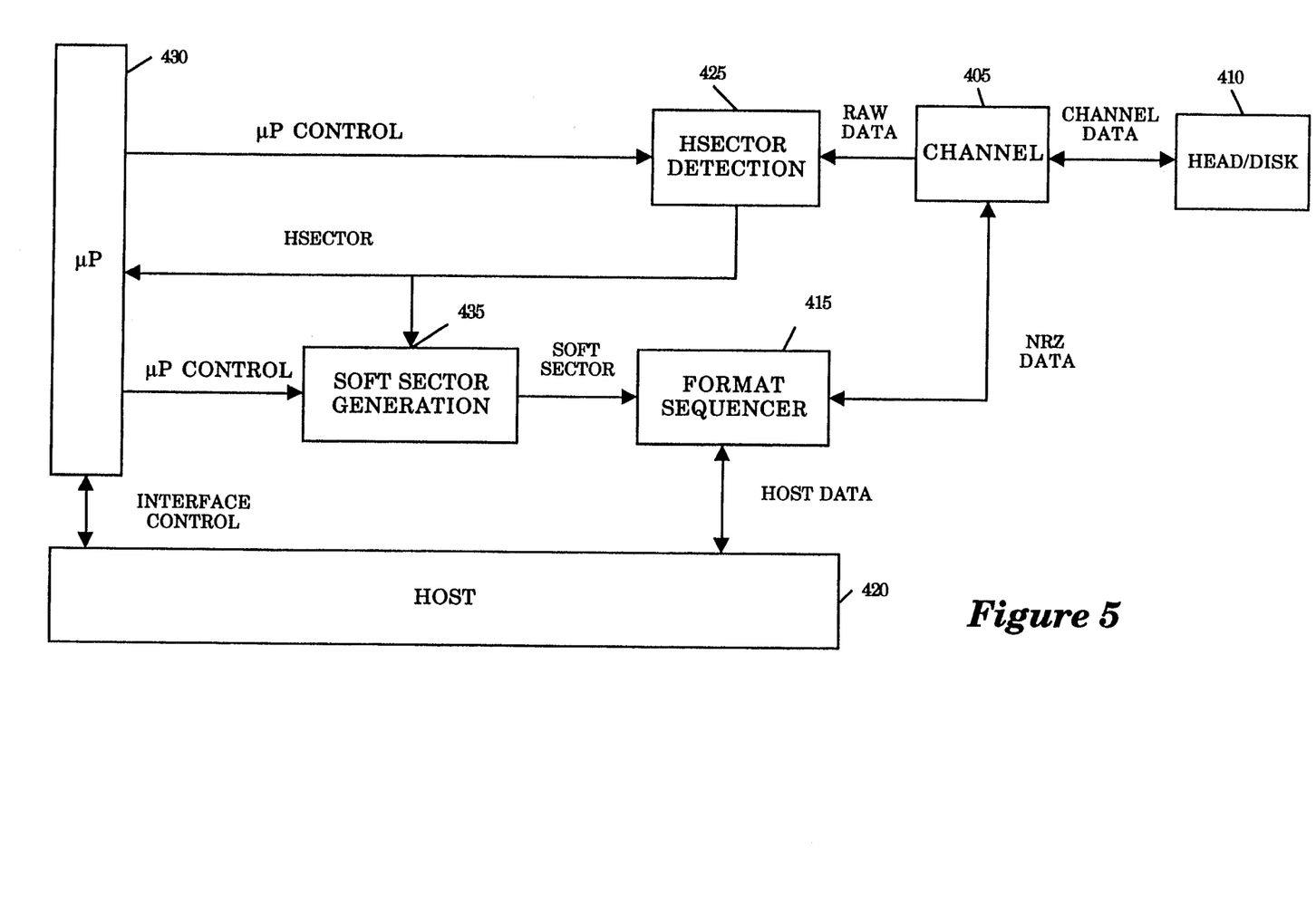
FIG. 5 illustrates an exemplary system utilizing the fault tolerant method for determination of a soft sector ID field in the present invention.

An exemplary system utilized in the fault tolerant method for determination of soft sector ID fields in the present invention is shown in FIG. 5. Data is communicated through channel 405 to head assembly 410 which writes and reads user data onto the magnetic disk. Similarly, the channel 405 converts the analog signals received from the head into digital data pulses and synchronizes a clock to the data. Data to be written to the disk is formatted by format sequencer 415. The channel provides data read to the format sequencer 415 which, during a read operation, strips the user data from the data format based upon the soft sector marks and provides the data to the host system 420. The raw data is also provided to the H or hard sector detection mechanism 425 which interprets data received from the channel 405 and determines the location of the hard sector marks. This information is provided to the microprocessor which controls the operation of the disk drive 430 and the format sequencer 415 and soft sector generator mechanism 435. The microprocessor, based upon the location of the hard sector mark, will control the soft sector generation block, in particular the programming of the counts to correctly identify the soft sector ID fields and the format of the magnetic disk drive. More particularly, the soft sector generator mechanism 435 specifies the position of the soft sector marks based upon the position of the hard sector marks and counter programming by the processor 430.

Figure 6A:
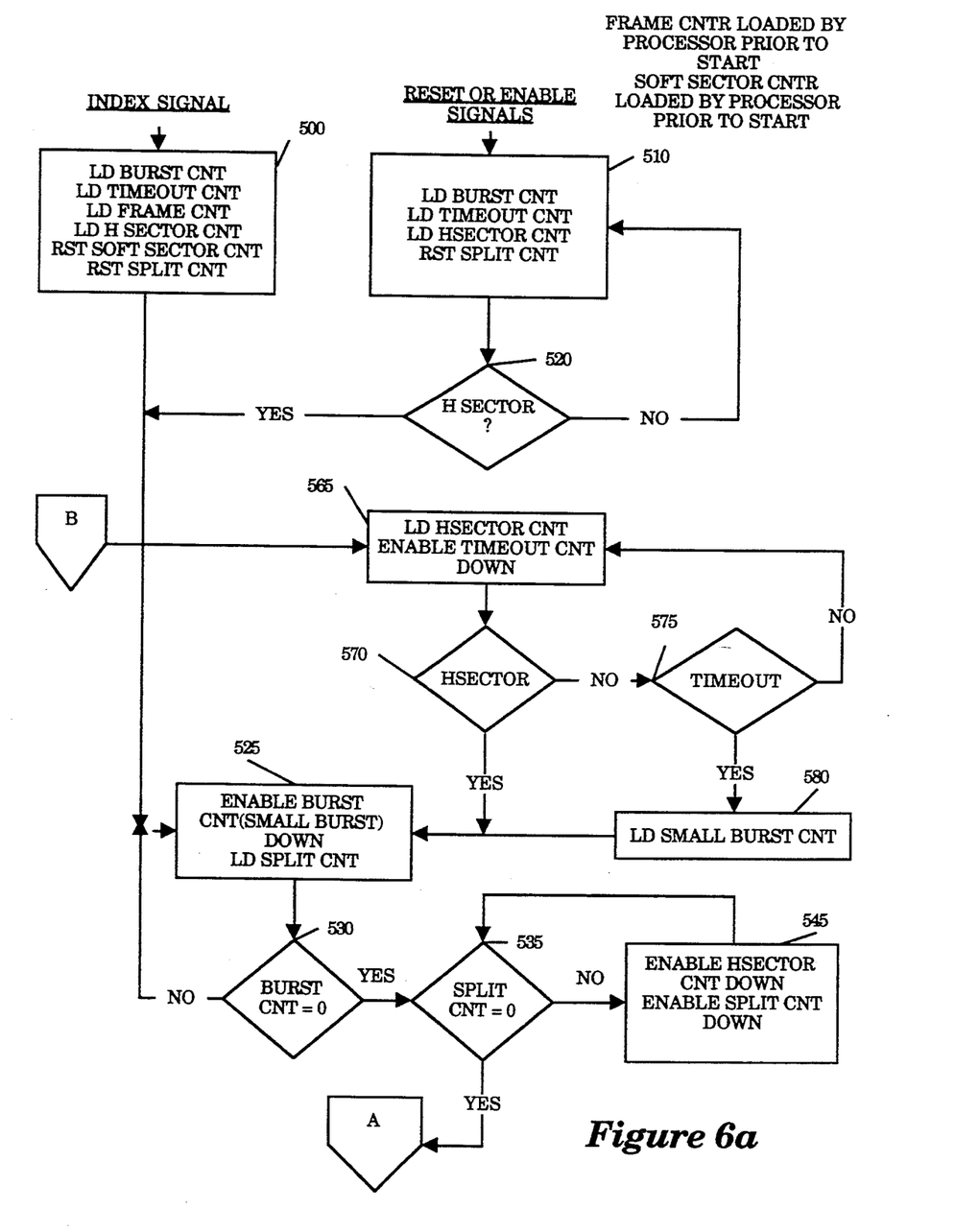
FIG. 6a and 6b provide a state diagram illustrating the states of the process for providing fault tolerant detection of ID fields of soft sectors.
Figure 6B:
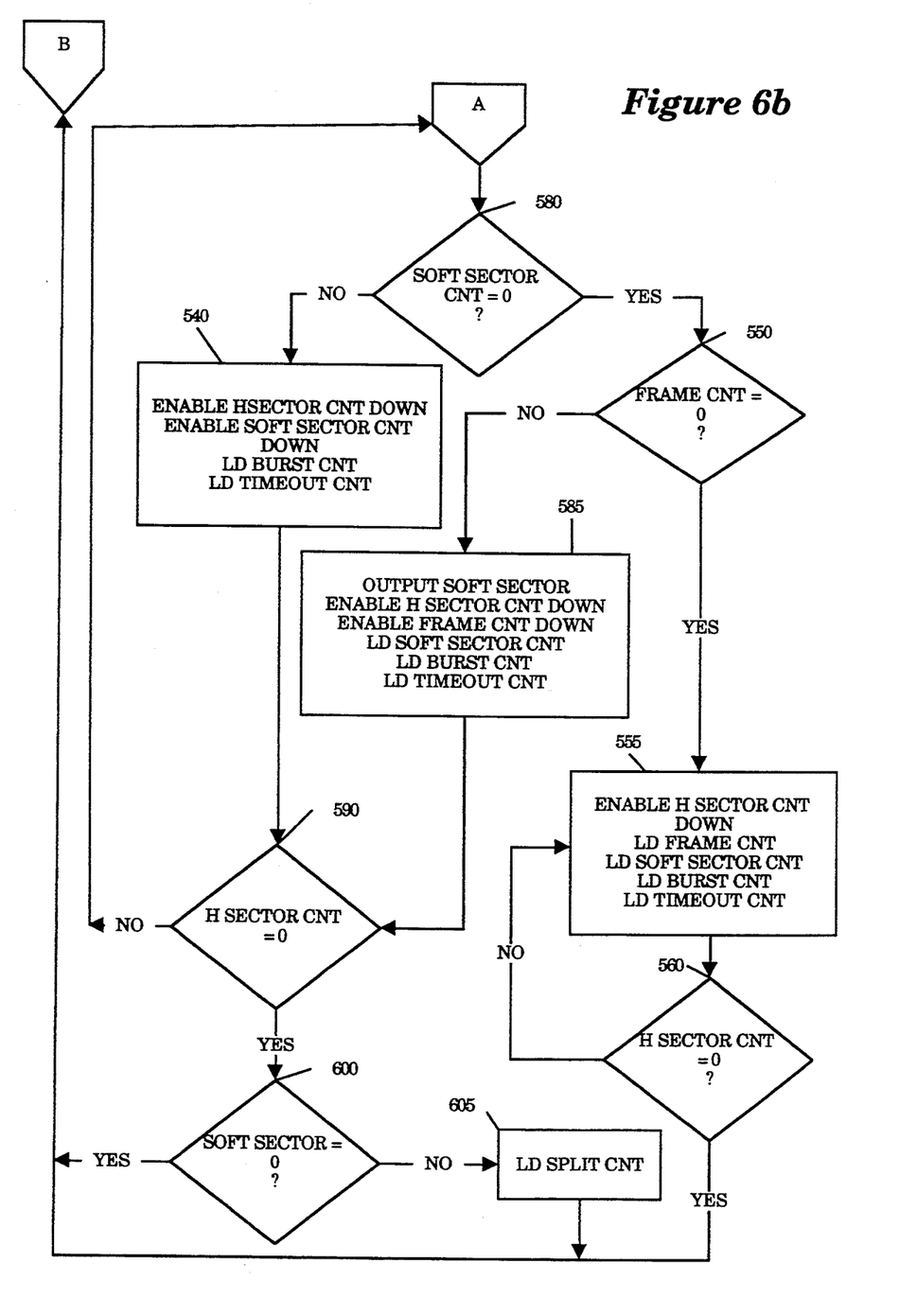

FIGS. 6a and 6b provide a state diagram showing the operation of the soft sector generator (435, FIG. 5). The Index, Reset and Enable inputs represent signals input to the soft sector generator, which in the present embodiment is a state machine. The assertion of these signals cause the soft sector generator to asynchronously enter the appropriate specified state. Each rectangular box represents steps performed once for each state machine clock cycle. Each counter is decremented one value each clock cycle. The diamond shaped boxes reflect hardware conditions that effect the transition to the next state. For example, state 510 is entered when a reset signal or enable signal is asserted. During every clock cycle while in state 510, a test is made, diamond 520, to determine if a hard sector mark is detected. If a hard sector mark is detected during the current clock cycle, the machine changes state to state 525. However, if no hard sector mark is detected during the current clock cycle, the machine remains in state 510 and therefore reloads the burst, time-out and H sector counters and resets the split counter.

Similarly, if an index signal is detected, the state machine enters the state 500 and loads the burst count, time-out count, frame count, H sector count, and resets the soft sector count and the split count. At the next clock cycle, the machine enters state 525 and enables the count down of the burst count and loads the split count. Additional states are entered and processing continues, as shown in FIGS. 6a and 6b.

The invention has been described in conjunction with the preferred embodiment. It is evident that numerous alternatives, modifications, variations and uses will be apparent those skilled in the art in light of the foregoing description.

What is claimed is:

1. In a magnetic disk comprising tracks, each track divided into hard sectors, each hard sector being separated by a gap, and the beginning of each hard sector being identified by a hard sector mark, a method for detecting soft sectors within hard sectors comprising the steps of:
   initially synchronizing to a first detected hard sector mark;
   initiating a hard sector count;
   initiating a time-out count at the expiration of the hard sector count;
   monitoring the track for a subsequent hard sector mark;
   if a time-out count is complete before the subsequent hard sector mark is detected, initiating a fault tolerant process for determination of the location of the beginning of a soft sector comprising the steps of:
   initiating a small burst count, said small burst count being of a duration that counts to the approximate location where a subsequent hard sector count is initiated, and
   initiating a hard sector count and initiating a soft sector count at the completion of the small burst count, said hard sector count counting out the distance to the end of the hard sector and said soft sector count counting out the duration of the soft sector during which user data operations are performed;
   wherein the beginning of the soft sector is determined if the hard sector mark is not detected.

2. The method as set forth in claim 1, further comprising the steps of:
   if a hard sector mark is detected prior to completion of the time-out count;
   initiating a burst count;
   initiating the hard sector count; and
   initiating the soft sector count at the completion of the burst count, during which user data operations are performed.

3. The method as set forth in claim 2, further comprising the steps of:
   if the soft sector count is not complete when the hard sector count is complete, said soft sector is split between adjacent hard sectors comprising the steps of;
   at the completion of the burst count if the hard sector mark is detected in the adjacent hard sector, initiating the hard sector count and initiating a split count, said split count providing sufficient time for the soft sector information to be sequenced,
   at the completion of the split count, initiating the soft sector count and user data operations.

4. The method as set forth in claim 1, further comprising the steps of:
   if the soft sector count is not complete when the hard sector count is complete, said soft sector is split between adjacent hard sectors comprising the steps of;
   at the completion of the small burst count, if a hard sector mark is not detected in the adjacent hard sector, initiating the hard sector count and initiating a split count, said split count providing sufficient time for the soft sector information to be sequenced,
   at the completion of the split count, initiating the soft sector count and user data operations.

5. The method as set forth in claim 1, wherein the step of initially synchronizing to a hard sector mark comprises the step of detecting a hard sector mark and initiating a burst count.

6. A fault tolerant magnetic disk drive assembly, wherein a magnetic disk comprises tracks, each track divided into hard sectors, and the beginning of each hard sector being identified by a hard sector mark, said disk drive assembly detecting soft sectors within hard sectors comprising:
   synchronizing means for synchronizing the disk drive assembly to a first detected hard sector mark;
   a first counting means for counting down a hard sector count;
   a second counting means for counting down a time-out count, said second counting means being initiated when the hard sector count completes;
   means for detecting a hard sector mark;
   a third counting means for counting down a small burst count if a hard sector mark is not detected prior to the completion of the time-out count, said small burst count being of a duration that counts to the approximate location of the beginning of a soft sector count;
   said first counting means for counting down a hard sector count being initiated at the completion of the small burst count, said hard sector count counting out the distance to the end of the hard sector; and
   a fourth counting means for counting down the soft sector count which is initiated at the completion of the small burst count, said soft sector count counting out the duration of the soft sector during which user data operations are performed;
   wherein the beginning of the soft sector is determined if the hard sector mark is not detected.

7. The fault tolerant magnetic disk drive assembly as set forth in claim 6, further comprising:
   a fifth counting means for counting down a burst count which is initiated if a hard sector mark is detected prior to completion of the time-out count;
   the first counting means counting down a hard sector count which is initiated at the completion of the burst count, and
   the fourth counting means counting down the soft sector count, said count initiated at the completion of the burst count, wherein user data operations are performed during the soft sector count.

8. The fault tolerant magnetic disk drive assembly as set forth in claim 7 further comprising means for splitting the soft sector between two adjacent hard sectors, if the soft sector count is not complete when the hard sector count is complete, comprising:
- a sixth counting means for counting down a split count which is initiated at the completion of the burst count if the hard sector mark is detected in the adjacent hard sector, said split count providing sufficient time for the soft sector information to be sequenced;
- said fourth counting means initiating the soft sector count at the completion of the split count.

9. The fault tolerant magnetic disk drive assembly as set forth in claim 6, further comprising means for splitting the soft sector between two adjacent hard sectors, if the soft sector count is not complete when the hard sector count is complete, comprising:
- a fifth counting means for counting down a split count which is initiated at the completion of the small burst count, if a hard sector mark is not detected in the adjacent hard sector, said split count providing sufficient time for the soft sector information to be sequenced;
- said fourth counting means initiating the soft sector count at the completion of the split count.

10. The fault tolerant magnetic disk drive assembly as set forth in claim 6, wherein said synchronizing means comprises means for detecting a first hard sector mark and a seventh counting means for counting down a burst count.

11. A system comprising a processor and a disk drive assembly for reading and writing to magnetic disk media coupled to the processor for providing fault tolerant detection of soft sectors containing user data, said system further comprising:
- a head assembly for reading and writing analog signals representative of data to the disk media;
- a channel coupled to the head assembly for converting the analog signals read from the media to digital data and converting digital data to be written to the magnetic media to analog signals;
- a hard sector detector coupled to the channel for detecting hard sector marks on the media;
- a soft sector generator for detection of soft sectors within a hard sector, said soft sector generation comprising;
  - a first counting means for counting down a hard sector mark,
  - a second counting means for counting down a time out count, said second counting means being initiated when the hard sector count completes, means for detecting a hard sector mark,
  - a third counting means for counting down a small burst count if a hard sector mark is not detected prior to the completion of the time-out count, said small burst count being of a duration that counts to the approximate location of the beginning of a soft sector count,
  - said first counting means for counting down a hard sector count being initiated at the completion of the small burst count, said hard sector count counting out the distance to the end of the hard sector, and
  - a fourth counting means for counting down the soft sector count which is initiated at the completion of the small burst count, said soft sector count counting out the duration of the soft sector during which user data operations are performed;
- a format sequencer coupled to the channel, the soft sector generator and the processor for extracting data received from the channel and sending data to be written to the channel, based upon detection of soft sectors.

12. The system as set forth in claim 11, said soft sector generator further comprising:
- a fifth counting means for counting down a burst count which is initiated if a hard sector mark is detected prior to completion of the time-out count;
- the first counting means counting down a hard sector count which is initiated at the completion of the burst count; and
- the fourth counting means counting down the soft sector count, said count initiated at the completion of the burst count, wherein user data operations are performed during the soft sector count.

13. The system as set forth in claim 12, said soft sector generator further comprising means for splitting the soft sector between two adjacent hard sectors, if the soft sector count is not complete when the hard sector count is complete, comprising:
- a sixth counting means for counting down a split count which is initiated at the completion of the burst count if the hard sector mark is detected in the adjacent hard sector, said split count providing sufficient time for the soft sector information to be sequenced;
- said fourth counting means initiating the soft sector count at the completion of the split count.

14. The system as set forth in claim 11, wherein said synchronizing means comprises means for detecting a first hard sector mark and a seventh counting means for counting down a burst count.

15. The system as set forth in claim 11, wherein the counting means are controlled by the processor.

* * * * *